United States Patent [19]

Park

[11] Patent Number: 5,903,679
[45] Date of Patent: May 11, 1999

[54] METHOD FOR DECODING SIGNAL VECTOR-QUANTIZED BY BLOCKS

[75] Inventor: Seop Hyeong Park, Taejeon, Rep. of Korea

[73] Assignee: Korea Telecommunication Authority, Seoul, Rep. of Korea

[21] Appl. No.: 08/843,248

[22] Filed: Apr. 14, 1997

[30] Foreign Application Priority Data

Apr. 15, 1996 [KR] Rep. of Korea ............ 96-11233

[51] Int. Cl.⁶ .................................................. G06K 9/00
[52] U.S. Cl. ........................................ 382/253; 382/239
[58] Field of Search ................................. 382/251, 252, 382/253, 270, 240, 199, 233, 250, 224, 115, 173, 232, 234, 235, 239, 244, 248, 260, 264, 277, 278; 348/384, 607; 358/463, 430, 433, 539; 704/222, 223, 203, 204

[56] References Cited

U.S. PATENT DOCUMENTS

| 5,534,925 | 7/1996 | Zhong ............................. 348/384 |
| 5,610,729 | 3/1997 | Nakajima ........................ 358/463 |
| 5,699,481 | 12/1997 | Shlomot et al. .............. 704/223 |
| 5,712,927 | 1/1998 | Kim et al. .................... 382/252 |
| 5,787,204 | 7/1998 | Fukuda ......................... 382/251 |
| 5,799,110 | 8/1998 | Israelsen et al. ........... 382/253 |
| 5,802,208 | 9/1998 | Podilchuk et al. .......... 382/253 |

OTHER PUBLICATIONS

Ramamurthi, Bhaskar and Allen Gersho, "Nonlinear Space–Variant Postprocessing of Block Coded Images", *IEEE Transactions on Acoustics, Speech, and Signal Processing*, vol. assp–34, No. 5, pp. 1258–1268. Oct. 1986.

Yang, Yongyi, Nikolas P. Galatsanos and Aggelos K. Katsaggelos, "Regularized Reconstruction to Reduce Blocking Artifacts of Block Discrete Cosine Transform Compressed Images", *IEEE Transactions on Circuits and Systems for Video Technology*, vol. 3, No. 6, pp. 421–432. Dec.1993.

Zakhor, Avideh, "Iterative Procedures for Reduction of Blocking Effects in Transform Image Coding", *IEEE Transactions on Circuits and Systems for Video Technology*, vol. 2, No. 1, pp. 91–95. Mar. 1992.

*Primary Examiner*—Leo H. Boudreau
*Assistant Examiner*—Bijan Tadayon
*Attorney, Agent, or Firm*—Merchant, Gould, Smith, Edell, Welter & Schmidt

[57] ABSTRACT

A method for producing a decoded signal approximate to an original signal upon decoding a quantized signal which is produced by vector-quantizing every block of an original signal or by vector-quantizing every block of a transform coefficient obtained after every block of the original signal is processed by a transform process such as a discrete cosine transform (DCT). The method includes the steps of determining a narrow vector quantization constraint set domain in which each vector or block divided from the decoded signal exists prior to the vector quantization at the transmitting site, and outputting a signal indicative of the determined narrow vector quantization constraint set domain, and performing a projection for returning a vector existing beyond the narrow vector quantization constraint set domain to its original domain, and repeating the projection for returning a vector existing beyond the narrow vector quantization constraint set domain to its original domain.

11 Claims, 3 Drawing Sheets

METHOD FOR DECODING SIGNAL VECTOR-QUANTIZED BY BLOCKS

BACKGROUND OF THE INVENTION

1. Field of the Invention

The present invention relates to a method for decoding a digital signal such as a digital picture or audio, and more particularly to a method for producing a decoded signal approximate to an original signal upon decoding a quantized signal which is produced by vector-quantizing every block of an original signal or by vector-quantizing every block of a transform coefficient obtained after every block of the original signal is processed by a transform process such as a discrete cosine transform (DCT).

2. Description of the Prior Art

Various post-processing methods have been proposed to produce a decoded signal approximate to an original signal. An example of such post-processing methods is a method using a low pass filter adapted to process a decoded signal (B. Ramamurthi and A. Gersho, Nonlinear space-variant post-processing of block coded images, IEEE Trans. on ASSP, vol. ASSP-34, no. 5, pp. 1258–1267, Oct. 1986). In accordance with this method, an edge-adaptive low pass filter is used for a decoded signal associated with a picture in order to eliminate a blocking phenomenon occurring at boundaries of blocks while maintaining edges.

Under the condition in which a decoder knows prior information about an original signal not yet encoded, it is possible to design a decoding scheme exhibiting superior performance. A representative decoding scheme is a method involving the steps of obtaining an image free of high frequency components at block boundaries by processing a normally-decoded image by a low pass filter or a projection operator having characteristics similar to the low pass filter, performing a DCT process for every block of the obtained image corresponding to that processed in a coding process, and adjusting a DCT coefficient obtained by the DCT process, thereby reducing coding errors. Such a method include a method, wherein a constrained minimization is solved in accordance with a steepest descent method (R. Rosenholtz and A. Zakhor, Iterative procedures for reduction of blocking effects in transform image coding, IEEE Trans. Circuits and Systems for Video Technology, vol. 2, no. 1, pp. 91–95, March 1992), and a scheme of projections onto convex sets (POCS) (Y. Yang, N. P. Galastsanos, and A. K. Katsaggelos, Regularized reconfiguration to reduce blocking artifacts of block discrete cosine transform compressed images, IEEE Trans. Circuits and Systems for Video Technology, vol. 3, no. 6, pp. 421–432, Dec. 1993).

These two methods are very similar in terms of concept, even though they are different in terms of interpretation. These methods are also schemes which can be adopted only in a case using a scalar quantizer to quantize transform coefficients in a block transform coding process. The low pass filter serves to reduce a blocking phenomenon occurring between successive blocks. Such a function of the low pass filter is based on an assumption that there is a continuity between successive blocks of an original image until those blocks of the original image are encoded. On the other hand, the range of DCT coefficient adjustment is called "a quantization constraint set (QCS)". This range corresponds to the range of values of DCT coefficients in a state prior to a quantization. In other words, the low pass filter provides a condition for making the DCT coefficient of a post-processed image have a value approximate to that of the original DCT coefficient. The process of adjusting DCT coefficients is called "a projection onto QCS".

The performance of the post processing utilizing prior information as a constraint set depends on a definition of the constraint set. The QCS may be derived from decision and reconstruction levels of the scalar quantizer. Such a QCS will be referred to as "an ordinary QCS (OQCS)". It is known that a narrow QCS, which is narrower in range than the OQCS exhibits a superior performance as compared to the OQCS (S. H. Park and Y. Yashima, Iterative reduction of blocking artifacts in transform coding by using a narrow quantization constraint, Proc. 1994 ITE Annual Convention, Japan, 1994, pp. 201–202, and Y. Yashima and S. H. Park, Image coding method, Japanese Patent Application No. Heisei 6-151981).

SUMMARY OF THE INVENTION

An object of the invention is to provide a method for decoding a vector-quantized signal, which is capable of expanding the QCS concept used in scalar quantizers to define QCS's, namely, VQCS's, used in vector quantizers, so that the defined VQCS's are used in the process of coding vector-quantized image or audio.

In accordance with one aspect of the present invention, a method is provided for producing a decoded image or audio signal by dividing, at a transmitting site, an image or audio signal into small blocks, vector-quantizing every block of the image or audio signal or every vector divided from the block of the image or audio signal, allocating a code to a representative value of the vector-quantized block or vector, and transmitting the code to a receiving site, while, at the receiving site, interpreting the received code, and reproducing a representative quantization vector based on the interpreted code, thereby obtaining a decoded image or audio signal, comprising the steps of: transforming the received coded data into a codeword for each vector quantizer corresponding to the code; transforming the codeword into a decoded signal having a re-constructed vector; dividing the decoded signal into small blocks or vectors corresponding to those at the transmitting site, determining a narrow vector quantization constraint set domain in which each vector or block divided from the decoded signal exists prior to the vector quantization at the transmitting site, and outputting a signal indicative of the determined narrow vector quantization constraint set domain; passing the decoded signal through a low pass filter, thereby reducing a blocking phenomenon occurring in the decoded signal; applying the signal indicative of the narrow vector quantization constraint set domain, along with an output signal from the low pass filter, to a narrow vector quantization constraint set domain projector unit, thereby performing a projection for returning a vector existing beyond the narrow vector quantization constraint set domain to its original domain; and applying a signal obtained after passing an output signal from the narrow vector quantization constraint set domain projector unit through the low pass filter, along with the signal indicative of the narrow vector quantization constraint set domain, to another narrow vector quantization constraint set domain projector unit, thereby repeating the projection for returning a vector existing beyond the narrow vector quantization constraint set domain to its original domain.

In accordance with another aspect of the present invention, a method is provided for producing a decoded image or audio signal by dividing, at a transmitting site, an image or audio signal into small blocks, orthogonally transforming every block of the image or audio signal, vector-quantizing every orthogonally-transformed block or every vector divided from the orthogonally-transformed block, allocating a code to a representative value of the vector-quantized block or vector, and transmitting the code to a receiving site, while, at the receiving site, interpreting the received code, and reproducing a representative quantization vector based on the interpreted code, thereby obtaining a decoded image or audio signal, comprising the steps of: transforming the received coded data into a codeword for each vector quantizer corresponding to the code; transforming the codeword into a decoded signal having a re-constructed vector in a reverse quantizer unit; dividing the decoded signal into small blocks or vectors corresponding to those at the transmitting site, determining a narrow vector quantization constraint set domain in which each vector or block divided from the decoded signal exists prior to the vector quantization at the transmitting site, and outputting a signal indicative of the determined narrow vector quantization constraint set domain; re-constructing the vectors or blocks of the decoded signal into blocks having a size to be used for an orthogonal transform in a block constructing unit; performing a reverse orthogonal transform for the re-constructed blocks in a reverse orthogonal transforming unit; passing data obtained after the reverse orthogonal transform through a low pass filter; orthogonally transforming an output signal from the low pass filter by blocks in an orthogonal transforming unit; applying the signal indicative of the narrow vector quantization constraint set domain, along with an output signal from the low pass filter, to a narrow vector quantization constraint set domain projector unit and an output signal from the orthogonal transforming unit, thereby performing a projection for returning a vector existing beyond the narrow vector quantization constraint set domain to its original domain; and applying a signal obtained after passing an output signal from the narrow vector quantization constraint set domain projector unit through the reverse orthogonal transforming unit, low pass filter unit and orthogonal transforming unit, along with the signal indicative of the narrow vector quantization constraint set domain, to another narrow vector quantization constraint set domain projector unit, thereby repeating the projection for returning a vector existing beyond the narrow vector quantization constraint set domain to its original domain.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
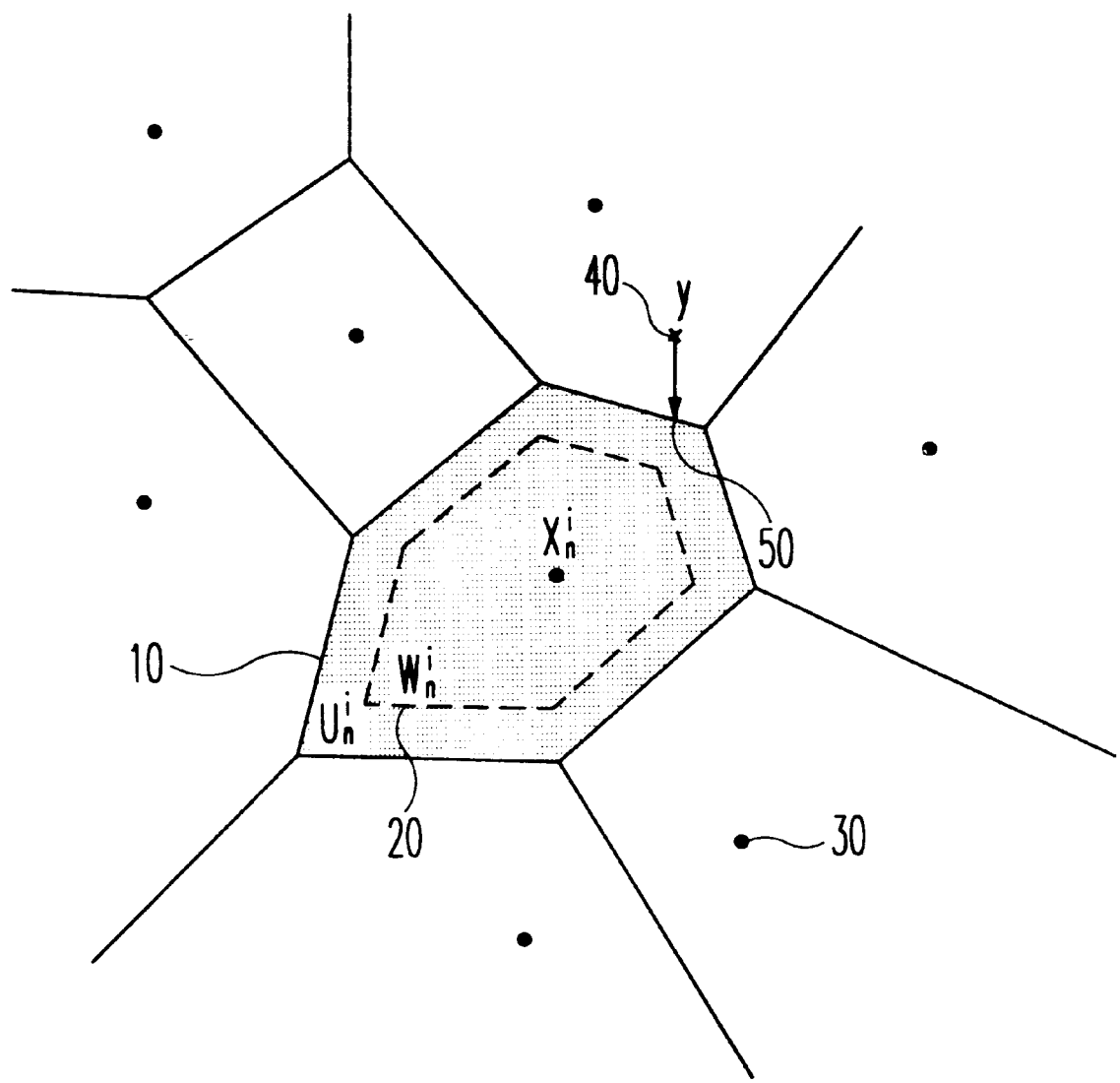
FIG. 1 is a schematic view illustrating codewords of vector quantizers in a multi-dimensional space and associated Voronoi domains, along with a projection for such Voronoi domains.

Hereinafter, the QCS and NQCS concepts of a scalar quantizer, which are utilized in the present invention, will be described. Also, the VQCS and NVQCS concepts of a vector quantizer will be described in conjunction with an expansion of the QCS and NQCS concepts.

A signal in a state not coded yet can be expressed in the form of column vectors as follows:

$$f = \begin{bmatrix} f_1 \\ \vdots \\ \vdots \\ \vdots \\ f_M \end{bmatrix} \quad (1)$$

where, "$f_i$" is an N-dimensional column vector of $\{f_{i,1}, f_{i,2}, \ldots, f_{i,N}\}$ ($f_i = \{f_{i,1}, f_{i,2}, \ldots, f_{i,N}\}^t$), and "t" in the expression of "$f_i$" means a transposed matrix.

When it is assumed that a block transform matrix having a size of N×N is "T", the transform coefficient vector $F_i$ of the N-dimensional column vector "$f_i$" is expressed as follows:

$$F_i = T f_i \quad (2)$$

In this connection, it is assumed that the n-th transform coefficient "$F_{i,n}$" of the transform coefficient vector "$F_i$" is quantized by a scalar quantizer $Q_n(\pm)$ having L levels. It is also assumed that a set of decision levels, $D_n$, of the scalar quantizer $Q_n(\pm)$ corresponds to "$\{d_n^0, \ldots, d_n^L\}$" ($D_n = \{d_n^0, \ldots, d_n^L\}$) whereas a set of reconstruction levels, $R_n$, of the scalar quantizer $Q_n(\pm)$ corresponds to "$\{r_n^1, \ldots, r_n^L\}$" ($R_n = \{r_n^1, \ldots, r_n^L\}$). In this case, the following relationship can be established:

$$-\infty \leq d_n^0 \leq r_n^1 \leq d_n^1 \leq r_n^2 d_n^2 \leq \ldots \leq d_n^{L-2} \leq r_n^{L-1} \leq d_n^{L-1} \leq r_n^L \leq d_n^L \leq \infty. \quad (3)$$

On the other hand, the quantized transform coefficient "$\underline{F}_{i,n}$" satisfies the following equation:

$$\underline{F}_{i,n} = Q_n(F_{i,n}) \in R_n. \quad (4)$$

Based on the above equation, the QCS of the scalar quantizer can be defined as follows:

$$C_q = \{f : F_{i,n}^{min} \leq F_{i,n} \leq F_{i,n}^{max}\} \quad (5)$$

where, "$F_{i,n}^{min}$" and "$F_{i,n}^{max}$" are determined from the decision levels.

When it is assumed that the projection operator, which is a projector for performing a projection for the QCS, is "$P_q$", "G" can be defined as follows:

$$G_i = \begin{bmatrix} G_{i,n} \\ \vdots \\ G_{i,n} \\ \vdots \\ G_{i,n} \end{bmatrix} = P_q F_i \quad (6)$$

In this case, "$G_{i,n}$" can be derived as follows:

$$G_{i,n} = \begin{cases} F^i_{n\,max}, & \text{if } F_{i,n} > F^{max} \\ F_{i,n}^{min}, & \text{if } F_{i,n} < F_{in}^{min} \\ F_{i,n}, & \text{otherwise} \end{cases} \quad (7)$$

On the other hand, "NQCS" is defined as follows:

$$C_q = \{f : F_{i,n} - \acute{e}_{i,n}(F_{i,n} - F_{in}^{min}) \leq F_{i,n} \leq F_{i,n} + \underline{v}_{i,n}(F_{i,n}^{max} - F_{i,n})\}$$

where, $0 > \acute{e}_{i,n}, \underline{v}_{i,n} \leq 1$

Now, the definition of "VQCS" and "NVQCS" will be described. First, a signal in a state not coded yet can be expressed in the form of column vectors as follows:

$$\underline{x} = \begin{bmatrix} \underline{x}_1 \\ \vdots \\ \vdots \\ \vdots \\ \underline{x}_p \end{bmatrix} \quad (9)$$

where, each column vector "$\underline{x}_i$" is an N-dimensional column vector of $\{\underline{x}_{i,1}, \underline{x}_{i,2}, \ldots, \underline{x}_{i,N}\}^t$ ($\underline{x}_i = \{\underline{x}_{i,1}, \underline{x}_{i,2}, \ldots, \underline{x}_{i,N}\}^t$), and "t" in the expression of "$\underline{x}_i$" means a transposed matrix. Generally, it is unnecessary for the column vectors to have the same dimension. In this case, "$\underline{x}$" may be an original signal or a vector consisting of transform coefficients.

In this connection, it is assumed that the n-th vector "$\underline{x}_n$" is quantized by a scalar quantizer $Q_c(\pm)$ having L levels. It is also assumed that the codebook, C, of the scalar quantizer $Q_n(\pm)$ corresponds to "$\{\underline{X}_n^1, \ldots, \underline{X}_n^L\}$" ($C = \{\underline{X}_n^1, \ldots, \underline{X}_n^L\}$) whereas "$V_n^i$" is the Voronoi domain of "$\underline{X}_n^i$". In this case, the following relationship can be established:

$$d(\underline{x}_n, \underline{x}_n^i) \leq d(\underline{x}_n, \underline{x}_n^i), \text{ if } \underline{x}_n \in V_n^i \quad (10)$$

Where a convex polytope including the boundary of the Voronoi domain "$V_n^i$" is defined as "$U_n^i$", the VQCS can be defined as follows:

$$C_{vq} = \{\underline{x} : \underline{x}_n^i \in U_n^i\} \quad (11)$$

FIG. 1 illustrates Voronoi domains 50 for code vectors 30 of the vector quantizer in an n-dimensional space. In FIG. 1, "$U_n^i$" corresponds to a shaded polytope 10 including its boundary. The projection of an optional vector y (denoted by the reference numeral 40 in FIG. 1) in the domain "$U_n^i$" means a process of finding a point nearest to the vector y, 40, from vectors existing in the domain "$U_n^i$", 10, thereby returning the rector y, 40, to the found point so that the vector y, 40, can exist in the domain "$U_n^i$", 10. The NVQCS is a new domain indicated by the phantom line in FIG. 1. and obtained by reducing the convex polytope corresponding to the domain "$U_n^i$", 10. This domain is denoted by the reference numeral 20 in FIG. 1. The domain 20 is defined as a domain "$W_n^i$". Accordingly, the NVQCS, $C_{nvq}$, can be defined as follows:

$$C_{nvq} = \{\underline{x} : \underline{x}_n^i \in W_n^i\} \quad (12)$$

It can be understood from the above equation that an NVQCS can be derived from a given VQCS by reducing a convex polytope corresponding to the VQCS, thereby obtaining another convex polytope. However, a very complex computation is required to derive a convex polytope including a plurality of vectors (namely, codewords) existing in a multi-dimensional space. Even when such a convex polytope is derived, it is also very difficult to arrange projection operators for the convex polytope in the form of a simple equation.

In accordance with the present invention, a spherical NVQCS (SNVQCS) and a cubic NVQCS (CNVQCS) are defined to simplify the above-mentioned complex process, as follows:

$$S_n^i = \{x_n : \|x_n - x_n^i\| \leq R_n^i\} \quad (13)$$

where, "$R_n^i$" is an optional positive real number limiting the size of "$S_n^i$".

Using "$S_n^i$", the SNVQCS can be defined as follows:

$$C_{SNVQ} = \{\underline{x} : \underline{x}_n \in S_n^i, \text{ if } Q_c(\underline{x}_n) = \underline{x}_n \forall n\}$$

Where it is assumed that "$P_{snvq}$" is a projection operator performing a projection for the SNVQCS, a vector y, which is projected to the SNVQCS under the condition in which an optional vector $\underline{x}$ is given, can be expressed as follows:

$$y = C_{snvq}\underline{x} \quad (14)$$

In this case, "$y_n^i$" can be derived as follows:

$$y_n^i = \begin{cases} x_n^i, & \text{if } \|x_n^i - X_n^i\| \leq R_n^i, \\ X_n^i + \dfrac{R_n}{\|x_n^i - X_n^i\|}(x_n^i - X_n^i), & \text{otherwise} \end{cases} \quad (15)$$

The following set about a given "$\underline{x}_n^i$" is also defined:

$$C_n^i = \left\{ \underline{x} : \begin{bmatrix} |x_1 - X_{n,1}^i| \\ \vdots \\ |x_n - X_{n,k}^i| \\ \vdots \\ |x_N - X_{n,N}^i| \end{bmatrix} \leq \begin{bmatrix} R_{n,1}^i \\ \vdots \\ R_{n,k}^i \\ \vdots \\ R_{n,N}^i \end{bmatrix} \right\} \quad (16)$$

where, "$R_{n,k}^i$" is an optional positive real number limiting the size of "$C_n^i$".

Using "$C_n^i$", the CNVQCS can be defined as follows:

$$C_{CNVQ} = \{\underline{x} : \underline{x}_n \in C_n^i, \text{ if } Q_c(\underline{x}_n) = \underline{X}_n^i \forall n\} \quad (17)$$

"$C_{CNVQ}$" is identical to that obtained when the case of "$\acute{e}_{i,n} = \underline{v}_{i,n}$" in the NQCS of the above-mentioned scalar quantizer is expanded to have a multi-dimension for each component "$\underline{x}_{n,k}$" of the vector "$\underline{x}_n$". Accordingly, the projection for "$C_{CNVQ}$" can be derived in the same manner as the projection for "QCS".

Where the SNVQCS and associated projection operator are defined as mentioned above, it is possible to configure a very efficient post processing system because the projection in the post processing requires few computations. The NQCS, which is reduced in the Voronoi domain size as compared to the OQCS, also exhibits superior performance. Accordingly, superior performance can be obtained when the SNVQCS is used in the post processing, as compared to the VQCS.

Now, examples, in which the above-mentioned VQCS, NVQCS, SNVQCS and CNVQCS are used for the decoding of vector-quantized signals, respectively, will be described.

Figure 2:
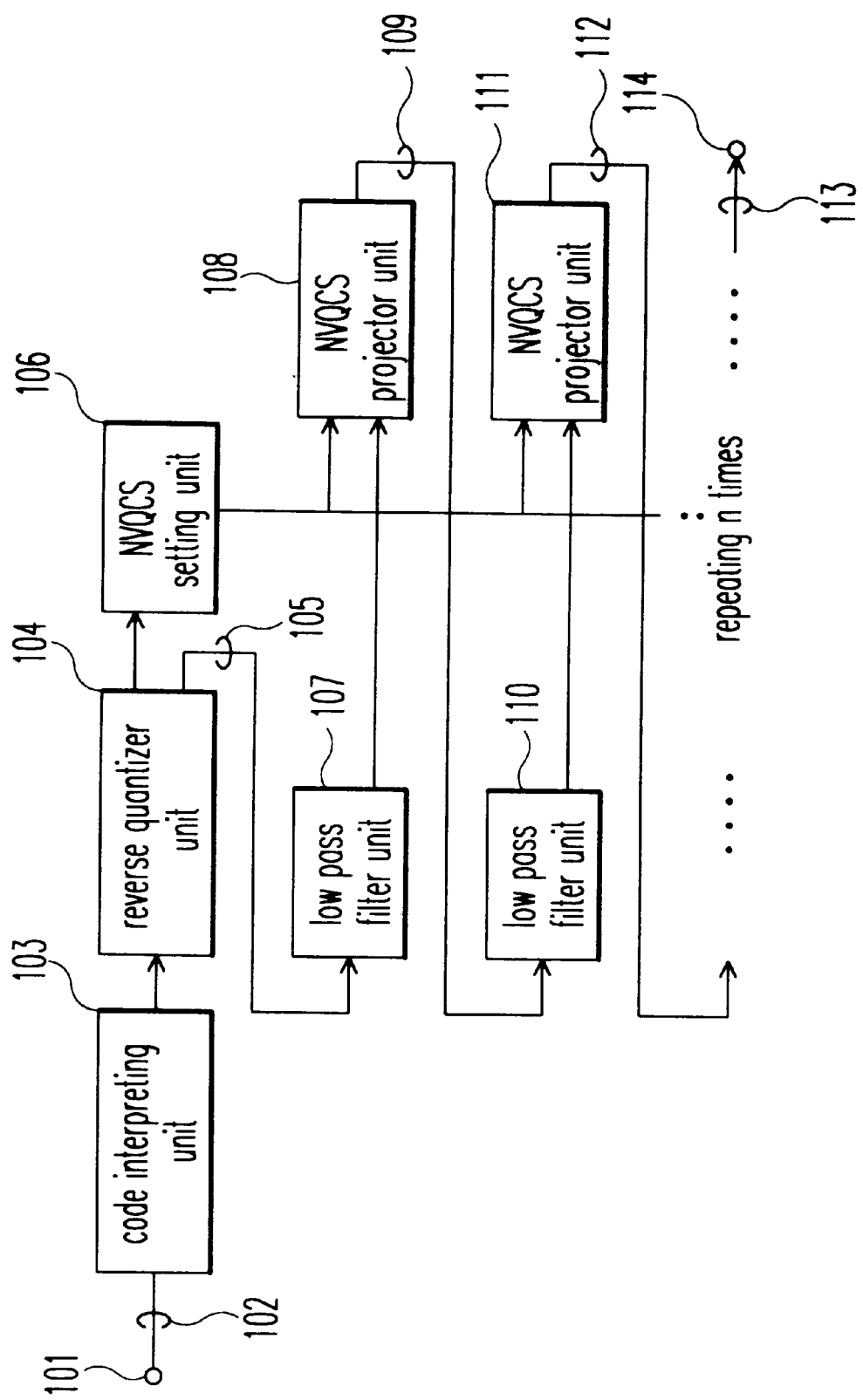
FIG. 2 is a block diagram illustrating an apparatus which carries out a method for decoding a vector-quantized image or audio signal in accordance with an embodiment of the present invention.

FIG. 2 is a block diagram illustrating an apparatus which carries out a method for decoding a vector-quantized image or audio signal in accordance with the present invention. In FIG. 2, the reference numeral 101 denotes a receiving stage, the reference numeral 102 denotes coded data received at the receiving stage 101, the reference numeral 103 denotes a code interpreting unit, the reference numeral 104 denotes a reverse quantizer unit for reproducing a representative value of a quantizing vector for each code, the reference numeral 105 denotes decoded data, the reference numeral 106 denotes a range setting unit for determining the range of an NVQCS, the reference numeral 107 denotes a low pass filter unit for removing coding noise existing between vectors, the reference numeral 108 denotes an NVQCS projector unit for projecting data filtered by the low pass filter unit 107 to the NVQCS, the reference numeral 109 denotes data resulting from the projection of the filtered data to the NVQCS, the reference numeral 110 denotes another low pass filter unit, the reference numeral 111 denotes another NVQCS projector unit, the reference numeral 113 denotes final output data obtained after completing n data processings through the low pass filters and NVQCS projector units, and the reference numeral 114 denotes an output stage.

Now, the operation of the apparatus having the above-mentioned configuration will be described.

Once coded data 102 is received at the receiving stage 101, the code interpreting unit 103 determines a vector quantizer codeword corresponding to each code. Based on the codeword from the code interpreting unit 103, the reverse quantizer unit 104 performs a re-construction of each vector, thereby outputting a decoded signal 105. The codeword from the code interpreting unit 103 is also sent to the NVQCS setting unit 106 which, in turn, determines an NVQCS as expressed in the equation (12), based on the codeword. In this case, the projection operator used in the NVQCS projector unit 108 depends on the determined VQCS, NVQCS, SNVQCS or CNVQCS. The decoded signal 105 passes through the low pass filter unit 107. The low pass filter unit 107 greatly affects the picture quality of a decoded image. As the low pass filter unit 107, a general half-band filter may be used. In place of the use of the low pass filter unit 107, a projection operator, which exhibits a characteristic similar to the low pass filter unit 107, may be used to remove high frequency components existing at the boundaries of blocks. Both the filtered signal emerging from the low pass filer unit 107 and the output from the NVQCS setting unit 106 are sent to the NVQCS projector unit 108. Where the NVQCS setting unit 106 determines the SNVQCS, the projector defined by the equation (15) is used in this process. In the NVQCS setting 106, the NVQCS domain, for example, "$W_n^i$" (the domain 20 in FIG. 1), which exists prior to the vector quantization at the transmitting site, is derived. Along with the derived NVQCS domain, the output signal from the low pass filter unit 107 is applied to the NVQCS projector unit 108 which, in turn, projects a vector y to the domain "$U_n^i$", thereby obtaining a vector (denoted by the reference numeral 50 in FIG. 1). That is, the NVQCS projector unit 108 performs a projection for returning a vector existing beyond the NVQCS domain to its original domain. This is best shown in FIG. 1. The output signal 109 from the NVQCS projector unit 108 is then applied to the low pass filter unit 110. Along with the output from the NVQCS setting unit 106, the output signal from the low pass filter unit 110 is then applied to the NVQCS projector unit 111 which, in turn, performs a projection for the received signal. In accordance with the projection of the NVQCS projector unit 111, the vector, which exists beyond the NVQCS domain due to a variation in the vector value occurring during the filtering operation of the low pass filter unit 110, is returned to its original NVQCS domain. An output signal 112 from the NVQCS projector unit 111 passes through another low pass filter unit (not shown). Along with the output from the NVQCS setting unit 106, an output signal from the low pass filter unit (not shown) is applied to another NVQCS projector unit (not shown). This procedure is repeated several times (n times), thereby obtaining output data at the output stage 114. The processing times n may be freely determined in the decoding unit.

Figure 3:
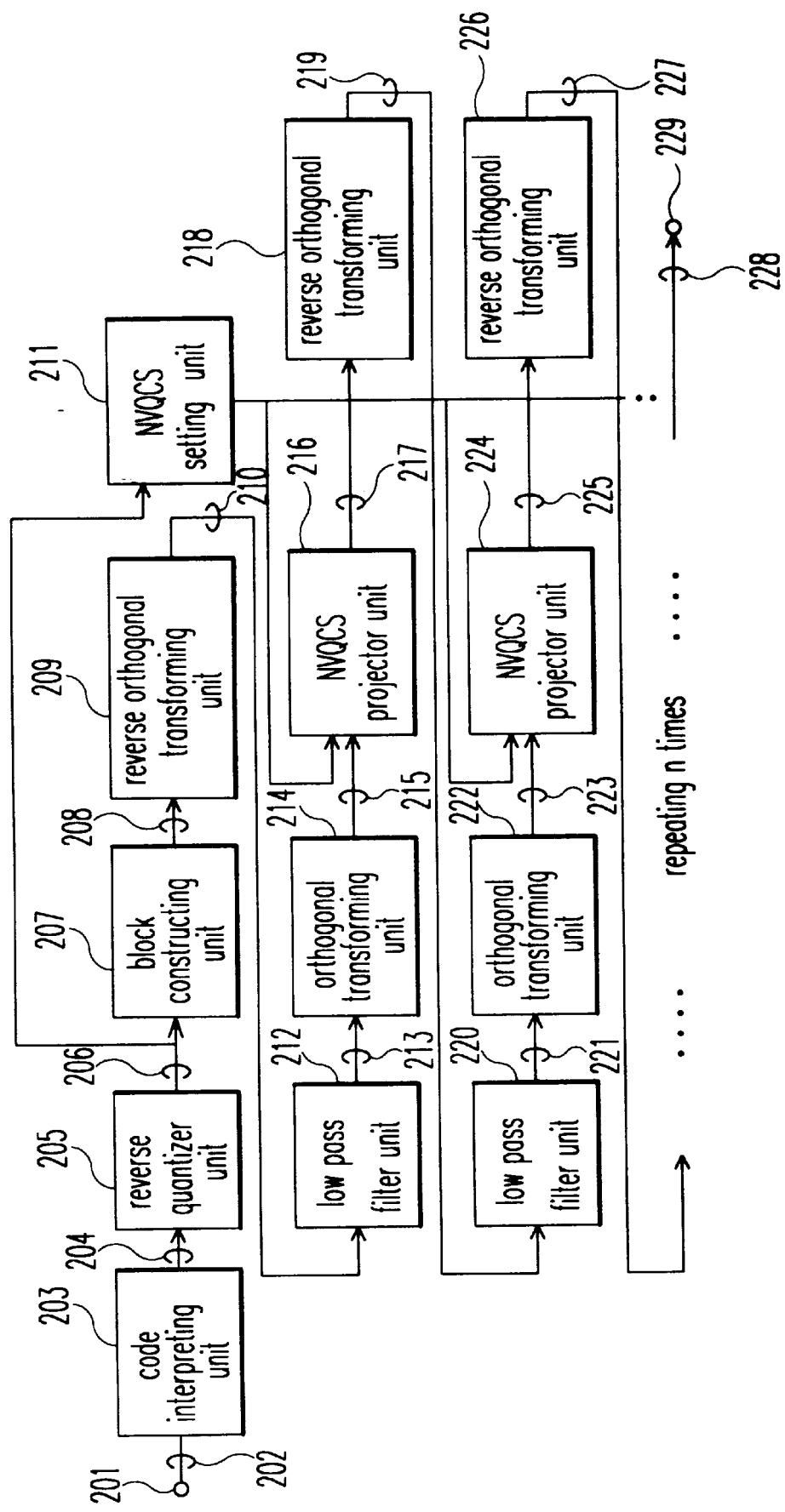
FIG. 3 is a block diagram illustrating an apparatus which carries out a method for decoding picture or audio partition vector-quantized at a transform domain in accordance with another embodiment of the present invention.

FIG. 3 is a block diagram illustrating an apparatus which carries out a method for decoding picture or audio partition vector-quantized at a transform domain in accordance with the present invention.

In FIG. 3, the reference numeral 201 denotes a receiving stage, the reference numeral 202 denotes coded data received at the receiving stage 201, the reference numeral 203 denotes a code interpreting unit, the reference numeral 204 denotes a representative value of a quantizing vector for each code, the reference numeral 205 denotes a reverse quantizer unit for reproducing the representative value of the quantizing vector for each code, the reference numeral 206 denotes decoded data, the reference numeral 207 denotes a block constructing unit for constructing a block based on each vector, the reference numeral 208 denotes data about each block of a transform domain, the reference numeral 209 denotes a reverse orthogonal transforming unit which carries out a transform for every block, the reference numeral 210 denotes decoded data, the reference numeral 211 denotes a range setting unit for determining the range of an NVQCS, the reference numeral 212 denotes a low pass filter unit for removing coding noise existing between vectors, the reference numeral 213 denotes an output signal from the low pass filter unit 212, the reference numeral 214 denotes an orthogonal transforming unit, the reference numeral 216 denotes an NVQCS projector unit for projecting an orthogonal transform coefficient to the NVQCS, the reference numeral 217 denotes the orthogonal transform coefficient projected to the NVQCS, the reference numeral 218 denotes another reverse orthogonal transforming unit, the reference numeral 220 denotes another low pass filter unit, the reference numeral 222 denotes another orthogonal transforming unit, the reference numeral 224 denotes another NVQCS projector unit, the reference numeral 226 denotes another reverse orthogonal transforming unit, the reference numeral 228 denotes final output data obtained after completing n data processings through the low pass filters and NVQCS projector units, and the reference numeral 229 denotes an output stage.

Now, the operation of the apparatus having the above-mentioned configuration will be described. This operation is carried out in a manner similar to that of the apparatus shown in FIG. 2.

Once coded data 202 is received at the receiving stage 201, the code interpreting unit 203 determines the index of a vector quantizer corresponding to each code. Based on the index from the code interpreting unit 203, the reverse quantizer unit 205 derives a vector 206 associated with a decoding process corresponding to each code. Based on the derived vector 206, the block constructing unit 207 performs a block reconstruction to produce a block having a size to be used in an orthogonal transform. The block constructing unit 207 outputs block data 208 consisting of a transform coefficient. The block data 208 is sent to the reverse orthogonal transforming unit 209 which, in turn, performs a reverse orthogonal transform for the received data, thereby outputting decoded data 210. The decoded vector 206 is also applied to the NVQCS setting unit 211 which, in turn, determines an NVQCS as expressed in the equation (12), based on the received vector. In this case, the projection operator used in the NVQCS projector unit 216 or 224 depends on the determined VQCS, NVQCS, SNVQCS or CNVQCS. The decoded data 210 passes through the low pass filter unit 212. An output signal 213 from the low pass filter unit 212 is sent to the orthogonal transforming unit 214 which, in turn, carries out an orthogonal transform for the received signal by blocks, thereby producing orthogonally-transformed data 215. The orthogonally-transformed data 215 is then applied to the NVQCS projector unit 216. The output signal from the NVQCS projector unit 216, which is an orthogonal transform coefficient 217 projected to the NVQCS, are sequentially sent to the reverse orthogonal transforming unit 218, low pass filter 220, orthogonal transforming unit 222, and NVQCS projector unit 224, so that it is repeatedly subjected to the same processes as those in the reverse orthogonal transforming unit 209, low pass filter 212, orthogonal transforming unit 214, NVQCS projector unit 216. This procedure is repeated several times, thereby obtaining output data 228 at the output stage 229.

In accordance with the present invention, the conventional method, which can effectively remove coding noise by use of a scalar quantizer, can be applied to a vector quantization, based on an expanded concept. In this case, the same basic effects as in the conventional method can be obtained.

In particular, the present invention effectively removes coding noise included in vector-quantized audio or image, for example, a blocking or ringing phenomenon. In accordance with the present invention, it is also possible to recover signals very similar to original signals without requiring any post processing, as compared to normally-recovered signals.

Furthermore, it is possible to derive convex polytopes and associated projections without requiring any complex computation when the SNVQCS or CNVQCS proposed in accordance with the present invention. Accordingly, an advantage is that a simple system is configured.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for producing a decoded image or audio signal by dividing, at a transmitting site, an image or audio signal into small blocks, vector-quantizing every block of the image or audio signal or every vector divided from the block of the image or audio signal, allocating a code to a representative value of the vector-quantized block or vector, and transmitting the code to a receiving site, while, at the receiving site, interpreting the received code, and reproducing a representative quantization vector based on the interpreted code, thereby obtaining a decoded image or audio signal, comprising the steps of:

transforming the received coded data into a codeword for each vector quantizer corresponding to the code;

transforming the codeword into a decoded signal having a re-constructed vector;

dividing the decoded signal into small blocks or vectors corresponding to those at the transmitting site, determining a narrow vector quantization constraint set domain in which each vector or block divided from the decoded signal exists prior to the vector quantization at the transmitting site, and outputting a signal indicative of the determined narrow vector quantization constraint set domain;

passing the decoded signal through a low pass filter, thereby reducing a blocking phenomenon occurring in the decoded signal;

applying the signal indicative of the narrow vector quantization constraint set domain, along with an output signal from the low pass filter, to a narrow vector quantization constraint set domain projector unit, thereby performing a projection for returning a vector existing beyond the narrow vector quantization constraint set domain to its original domain; and applying a signal obtained after passing an output signal from the narrow vector quantization constraint set domain projector unit through the low pass filter, along with the signal indicative of the narrow vector quantization constraint set domain, to another narrow vector quantization constraint set domain projector unit, thereby repeating the projection for returning a vector existing beyond the narrow vector quantization constraint set domain to its original domain.

2. The method in accordance with claim 1, wherein the step of determining the narrow vector quantization constraint set domain comprises the step of determining a range, in which a vector value prior to the quantization exists, based on the representative quantization vector value prior to the decoding.

3. The method in accordance with claim 2, wherein the step of determining the narrow vector quantization constraint set domain comprises the step of re-constructing the domain in the form of a convex polytope so as to easily drive the value projected in each narrow vector quantization constraint set domain projector unit.

4. The method in accordance with claim 2, wherein the step of determining the narrow vector quantization constraint set domain comprises the step of varying the value projected in each narrow vector quantization constraint set projector unit in accordance with each component of the vector.

5. The method in accordance with claim 1, wherein the narrow vector quantization constraint set domain includes a narrow vector quantization constraint set defined by the following equation:

$$C_{nvq} = \{\underline{x} : \underline{x}_n^i \in W_n^i\}$$

where, "$\underline{x}_n^i$" is an n-th vector, and "$W_n^i$" is a new domain obtained by reducing a convex polytope formed by reconstructing the narrow vector quantization constraint set domain.

6. The method in accordance with claim 1, wherein the narrow vector quantization constraint set domain includes a spherical narrow vector quantization constraint set domain defined as follows:

$$C_{SNVQ} = \{\underline{x} : \underline{x}_n \in s_n^i, \text{ if } O_c(\underline{x}_n) = \underline{x}_n^i \forall n\}$$

where, $O_c$ is the vector quantizer, "$\underline{x}_n$" is an n-th vector, and "$S_n^i$" is a new domain obtained by reducing a convex polytope formed by reconstructing the narrow vector quantization constraint set domain, the "$S_n^i$" being defined by the equation of "$S_n^i = \{\underline{x}_n : \|\underline{x}_n - \underline{x}_n^i\| \leq R_n^i\}$".

7. The method in accordance with claim 1, wherein the narrow vector quantization constraint set domain includes a cubic narrow vector quantization constraint set defined by the following equation:

$$C_{CNVQ} = \{\underline{x} : \underline{x}_n \in c_n^i, \text{ if } O_c(\underline{x}_n^i \forall n\}$$

where, $O_c$ is the vector quantizer, "$\underline{x}_n^i$" is an n-th vector, and "$c_n^i$" is a new domain obtained by reduced a convex polytope formed by reconstructing the narrow vector quantization constraint set domain.

8. A method for producing a decoded image or audio signal by dividing, at a transmitting site, an image or audio signal into small blocks, orthogonally transforming every block of the image or audio signal, vector-quantizing every orthogonally-transformed block or every vector divided from the orthogonally-transformed block, allocating a code to a representative value of the vector-quantized block or vector, and transmitting the code to a receiving site, while, at the receiving site, interpreting the received code, and reproducing a representative quantization vector based on the interpreted code, thereby obtaining a decoded image or audio signal, comprising the steps of:

transforming the received coded data into a codeword for each vector quantizer corresponding to the code;

transforming the codeword into a decoded signal having a re-constructed vector in a reverse quantizer unit;

dividing the decoded signal into small blocks or vectors corresponding to those at the transmitting site, determining a narrow vector quantization constraint set domain in which each vector or block divided from the decoded signal exists prior to the vector quantization at the transmitting site, and outputting a signal indicative of the determined narrow vector quantization constraint set domain;

re-constructing the vectors or blocks of the decoded signal into blocks having a size to be used for an orthogonal transform in a block constructing unit;

performing a reverse orthogonal transform for the re-constructed blocks in a reverse orthogonal transforming unit;

passing data obtained after the reverse orthogonal transform through a low pass filter;

orthogonally transforming an output signal from the low pass filter by blocks in an orthogonal transforming unit;

applying the signal indicative of the narrow vector quantization constraint set domain, along with an output signal from the low pass filter, to a narrow vector quantization constraint set domain projector unit and an output signal from the orthogonal transforming unit, thereby performing a projection for returning a vector existing beyond the narrow vector quantization constraint set domain to its original domain; and applying a signal obtained after passing an output signal from the narrow vector quantization constraint set domain projector unit through the reverse orthogonal transforming unit, low pass filter unit and orthogonal transforming unit, along with the signal indicative of the narrow vector quantization constraint set domain, to another narrow vector quantization constraint set domain projector unit, thereby repeating the projection for returning a vector existing beyond the narrow vector quantization constraint set domain to its original domain.

9. The method in accordance with claim 8, wherein the step of determining the narrow vector quantization constraint set domain comprises the step of determining a range, in which a vector value prior to the quantization exists, based on the representative quantization vector value prior to the decoding.

10. The method in accordance with claim 8, wherein the step of determining the narrow vector quantization constraint set domain comprises the step of re-constructing the domain in the form of a convex polytope so as to easily drive the value projected in each narrow vector quantization constraint set domain projector unit.

11. The method in accordance with claim 8, wherein the step of determining the narrow vector quantization constraint set domain comprises the step of varying the value projected in each narrow vector quantization constraint projector unit in accordance with each component of the vector.

* * * * *